US007774431B2

(12) United States Patent
Conn et al.

(10) Patent No.: US 7,774,431 B2
(45) Date of Patent: Aug. 10, 2010

(54) REAL TIME COLLABORATIVE ON-LINE MULTIMEDIA ALBUMS

(75) Inventors: Eric Conn, Woodbine, MD (US); Warren Citrin, Highland, MD (US)

(73) Assignee: Gloto, Fulton, MD (US)

( * ) Notice: Subject to any disclaimer, the term of this patent is extended or adjusted under 35 U.S.C. 154(b) by 779 days.

(21) Appl. No.: 11/515,531

(22) Filed: Sep. 5, 2006

(65) Prior Publication Data
US 2008/0275881 A1    Nov. 6, 2008

(51) Int. Cl.
G06F 15/16    (2006.01)
G06F 3/00    (2006.01)

(52) U.S. Cl. .................. 709/219; 709/204; 715/730
(58) Field of Classification Search ............. 709/204, 709/205
See application file for complete search history.

(56) References Cited

U.S. PATENT DOCUMENTS

| 6,035,323 | A | 3/2000 | Narayen et al. |
| 6,467,075 | B1* | 10/2002 | Sato et al. ............ 716/18 |
| 6,542,173 | B1* | 4/2003 | Buckley ............ 715/841 |
| 6,976,229 | B1* | 12/2005 | Balabanovic et al. ...... 715/838 |
| 7,028,075 | B2 | 4/2006 | Morris |
| 7,080,124 | B1 | 7/2006 | Shankar |
| 2002/0035697 | A1* | 3/2002 | McCurdy et al. ............ 713/200 |
| 2002/0087546 | A1 | 7/2002 | Slater et al. |
| 2002/0101539 | A1 | 8/2002 | Yokota |
| 2002/0120757 | A1 | 8/2002 | Sutherland et al. |
| 2002/0194195 | A1* | 12/2002 | Fenton et al. ............ 707/104.1 |
| 2003/0131002 | A1 | 7/2003 | Gennetten et al. |
| 2003/0236832 | A1* | 12/2003 | McIntyre et al. ........... 709/204 |
| 2004/0122835 | A1* | 6/2004 | McKibben et al. ......... 707/100 |
| 2004/0145603 | A1* | 7/2004 | Soares ................... 345/730 |
| 2004/0210845 | A1 | 10/2004 | Paul et al. |
| 2005/0225799 | A1 | 10/2005 | Berarducci et al. |
| 2006/0288274 | A1* | 12/2006 | Bustelo et al. ............. 715/513 |
| 2009/0013050 | A1* | 1/2009 | Giunta .................... 709/206 |

* cited by examiner

*Primary Examiner*—Joseph E Avellino
*Assistant Examiner*—Harunur Rashid
(74) *Attorney, Agent, or Firm*—Johnson & Scaturro; Michael Scaturro

(57) ABSTRACT

Methods and systems for creating, editing and monitoring real-time collaborative on-line multimedia albums at a host site. The invention facilitates the construction of the multimedia albums which comprise digital content, such as photos and video clips, provided by multiple digital content contributors, taken from each contributor's unique perspective. The invention uniquely creates these multimedia albums to be optimized for dynamic updating, real-time interaction, and rapid dissemination to a viewing audience, for public and/or private viewing, either one photo/video clip at a time or as a slide-show.

26 Claims, 12 Drawing Sheets

REAL TIME COLLABORATIVE ON-LINE MULTIMEDIA ALBUMS

FIELD OF THE INVENTION

The present invention relates generally, to digital media content accumulation and dissemination, and more particularly, to systems and methods for building real time collaborative on-line multimedia albums, each album comprised of digital photos and videos taken from the perspective of multiple contributing authors and optimized for real-time interaction, dynamic updating, rapid dissemination, and public viewing on a large scale.

BACKGROUND OF THE INVENTION

As cell phones have become ubiquitous as a vital voice and data communications device in society, the wireless telecommunications industry has been steadily expanding the data services offered to cell phone customers, with picture and multimedia messaging being marketed quite heavily. In addition, handset equipment makers have been integrating increasingly capable computer-like features into a new breed of smart cell phones and Personal Digital Assistants (PDAs). Embedded cameras that support still images and video capture have become standard equipment on most cell phones. Yet despite the expanding multimedia services and plans available and the ubiquitous marketing campaigns that aim to increase interest and sales, most consumers either don't use or rarely use the photographic and video features in their phones. Many possible reasons exist for this apparent lack of consumer interest including, for example, ease of use issues, reduced image quality as compared to single purpose digital still and video cameras, difficulty viewing, difficulty in transmitting and sharing resultant images, and lack of a compelling application of the technology.

Presently, there are numerous web sites that offer consumers the ability to upload and store digital images and videos from their camera phones. However, a drawback of these web sites is that they are oriented toward the individual, are updated infrequently, and are not real-time in nature. That is, the collections of photos and videos all relate to material and subjects of interest taken from the perspective of a single author and the services are not optimized for real-time interaction, dynamic updating, rapid dissemination, and public viewing on a large scale. These web sites serve as digital equivalents of a traditional photo album or scrap book that is incrementally modified or enhanced over a significant period of time by a single contributing individual. They also tend to be less ad hoc in nature and contain considered poses or images of events where the photo album editor consciously decided beforehand that the event warranted preserving and intentionally took measures to ensure that a still or video camera was present.

Thus, there exists the need for a service that provides for a digital multimedia album comprised of photos, videos or any suitable digital content taken from the perspective of multiple authors, optimized for real-time interaction, dynamic updating, rapid dissemination, and public viewing on a large scale.

SUMMARY OF THE INVENTION

The present invention relates to systems and methods for building real-time collaborative on-line multimedia albums over a network. In the described embodiment, the multimedia albums comprise digital content, such as photos and video clips, provided by multiple authors, taken from each author's unique perspective. Authors of the photos and video clips acquire the digital content via camera enabled cell phones and upload the digital content to a given multimedia album over a network, such as the Internet. The multimedia albums are optimized for dynamic updating, real-time interaction, and rapid dissemination to a viewing audience, for public and/or private viewing, either one photo/video clip at a time or as a slide-show.

According to one aspect of the invention, the multimedia albums are preferably constructed at a central server under the management of an on-line service entity, in response to a multimedia album requestor. Upon granting the request, storage space is allocated on a server by the service entity. Each newly constructed multimedia album is assigned a name of the requestor's choice, date of creation, unique email address for contributions, and a brief description. A newly constructed multimedia album is automatically opened to enable dynamic uploading of digital content received from various photo image and video clip contributors. In those cases where a newly constructed multimedia album pertains to a specific event, such as a birthday, wedding or sporting event, an event location may be further specified in the description so that other photo image and video clip contributors can find the multimedia album more easily at the hosting website via a search function.

According to another aspect of the invention, a multimedia album may be dynamically opened and closed at the discretion of the multimedia album requestor. There is no limit to how many times the multimedia album can be opened or closed by the owner of the multimedia album. Opening a multimedia album comprises permitting the entry of photo images, video clips or any other suitable digital content from various contributing authors as images arrive. Conversely, closing the multimedia album comprises denying such entry. For an opened multimedia album, a contributing author uploads his or her digital content over a network to an email address assigned to the multimedia album and the new digital content is immediately available for viewing by anyone with proper permissions.

According to still another aspect, the invention further contemplates the construction of multimedia albums for individual planned events (e.g., weddings, concerts, sporting contests), unplanned events (e.g., fires, accidents, etc.) and to capture a continuum of events that occur during a person's life.

BRIEF DESCRIPTION OF THE DRAWINGS

These and other objects, features and advantages of the present invention will become apparent through consideration of the detailed description of the invention, when considered in conjunction with the drawing Figures, in which:

FIG. 4 is an example of a GUI, screenshot, web page or the like that may be presented by the service entity website to register a new user;

FIG. 5 is an example of a GUI, screenshot, web page or the like that may be presented by the service entity presented to a registered user, after the registered user logs in;

FIG. 7 is an example of a GUI, screenshot, web page or the like that may be presented by the service entity website to a user for editing the preference settings of a previously created user owned cellblock;

FIG. 9 is an example of a GUI, screenshot, web page or the like that may be presented by the service entity website to a user in response to the user selecting one of the available embedded slide show modes for viewing the thumbnails as shown at GUI 800;

DETAILED DESCRIPTION OF THE INVENTION

The present invention will now be described in detail with reference to the drawings, which are provided as illustrative examples of the invention so as to enable those skilled in the relevant art(s) to practice the invention. Notably, the figures and examples below are not meant to limit the scope of the present invention to a single embodiment, but other embodiments are possible by way of interchange of some or all of the described or illustrated elements.

The present invention is a web based service that enables the building of dynamically updated, real-time collaborative on-line multimedia albums. The multimedia albums store digital photos, video clips or any suitable digital content uploaded over a network from photo and video clip authors using a hand held, camera enabled communication device, such as, for example, a cell phone, wireless fidelity (wifi) wifi-enabled camera, or PDA device. The collaborative on-line multimedia albums are optimized for real-time interaction, rapid dissemination, and public viewing of the uploaded digital photo and video clips. Private viewers may also view the collaborative on-line multimedia album, in real time, by issuing appropriate commands to a web-page via the Internet that initiates the display of the collaborative on-line multimedia album, either one picture/video clip at a time or as a slide-show, as is true for the public display.

Figure 1:
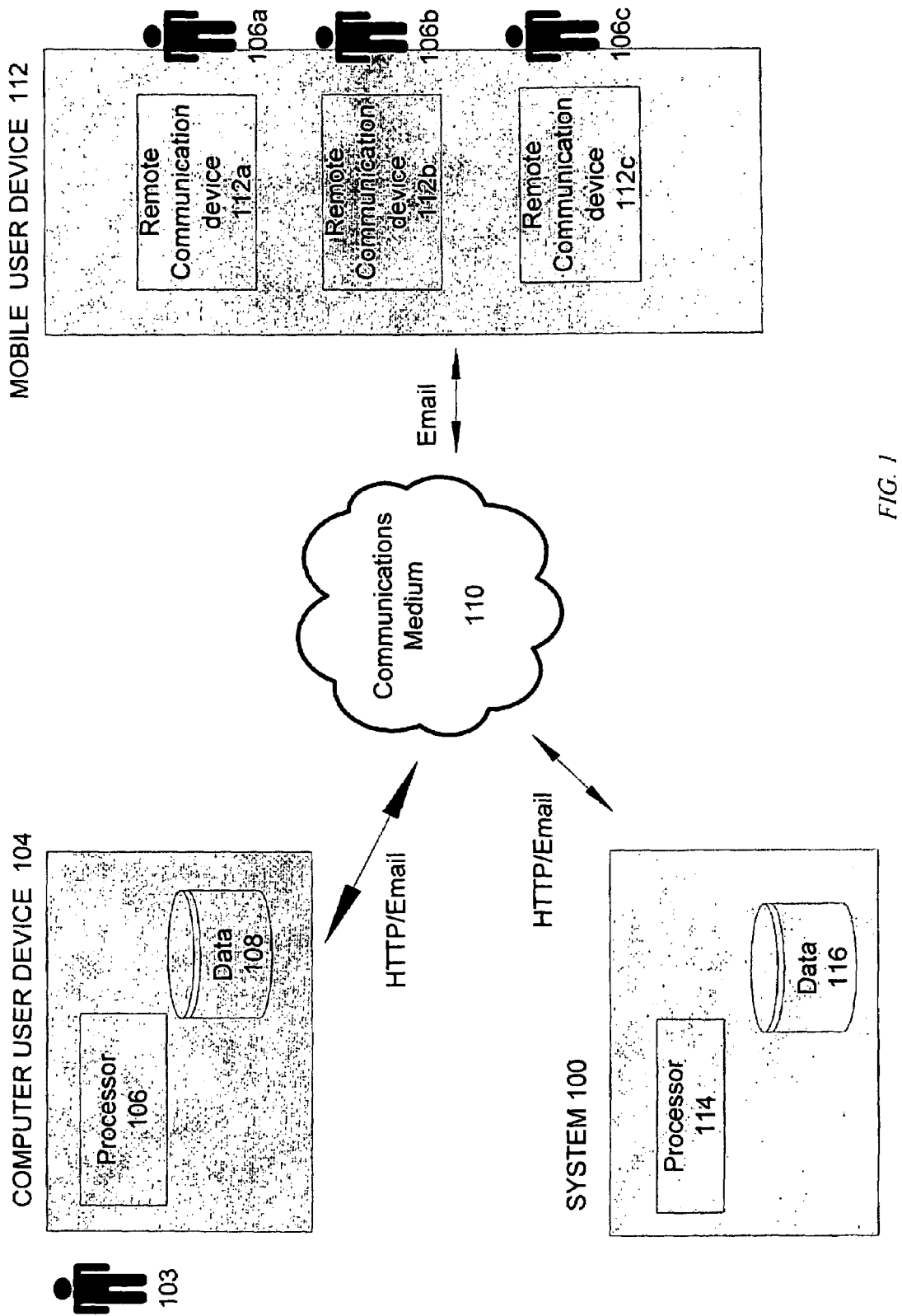
FIG. 1 is a block diagram of a system for enabling the building of collaborative on-line multimedia albums, on-line.

With reference now to FIG. 1, there is shown and described a system 100 for building real-time collaborative on-line multimedia albums. As shown and described herein, a first party 103 comprises a user of a computer user device 104, which may be, for example, a personal computer or laptop computer. The processor 106 is shown connected to a system 100 of the invention and to other mobile user devices 112 via a communications medium 110, such as the Internet, through standard Internet protocols such as HTTP and Email services. Computer user device 104 uses a standard Internet browser, such as Microsoft Internet Explorer™ or Netscape Navigator™ to connect to the System 100 to view, edit, or monitor digital content supplied by a user of computer user device 104 as well as content contributed by other users, such as the users of remote communication devices 112A, 112B and 112C, assuming the other users have been granted the proper permissions. Computer user device 104 also uses an email service for registration and general communications purposes.

FIG. 1 also shows three second parties, respectively labeled 106a-c, comprising users of respective remote communication devices 112a-c. The remote communication devices 112a-c may be, for example, a cellular telephone, IP-enabled camera device or personal digital assistant. Three such devices are illustrated herein for ease of explanation and do not limit the number of devices contemplated for use by the invention. It is only required that the remote communication devices include capabilities for acquiring and transmitting digital content including digital photos and video clips. Mobile users can comprise any party desiring to upload digital content to the system 100, including digital photos and digital video clips. Mobile users interact with the System 100 using standard text, picture, and video messaging services via Email protocol or other conventional Internet protocols.

The System 100 is seen to include a processor 114 and a data storage device 116. Computer user 104 is seen similarly to include a processor 106 and a data storage device 108. In their simplest forms, each of system 100 and computer user 104 comprises a conventional processor connected to a conventional data storage system, for example, comprising a combination of optical memory, magnetic memory and semiconductor memory. Each of system 100 and 104 further includes conventional computing system components such as a user interface, operating system and software, communications interface and other standard components and features as are known in the art. The reader will appreciate that the invention is not limited to any particular system configuration. Numerous system variations, including multi-processor systems, distributed data processing systems, server-based computing systems, notebook-based computing systems, mainframe-based computer systems and others will now be apparent.

The various parties are seen to communicate through an appropriate communications medium 110, for example, comprising a cellular telephone communications system, a public or private network such as the Internet, and/or others as will now be apparent to the reader.

Figure 2:
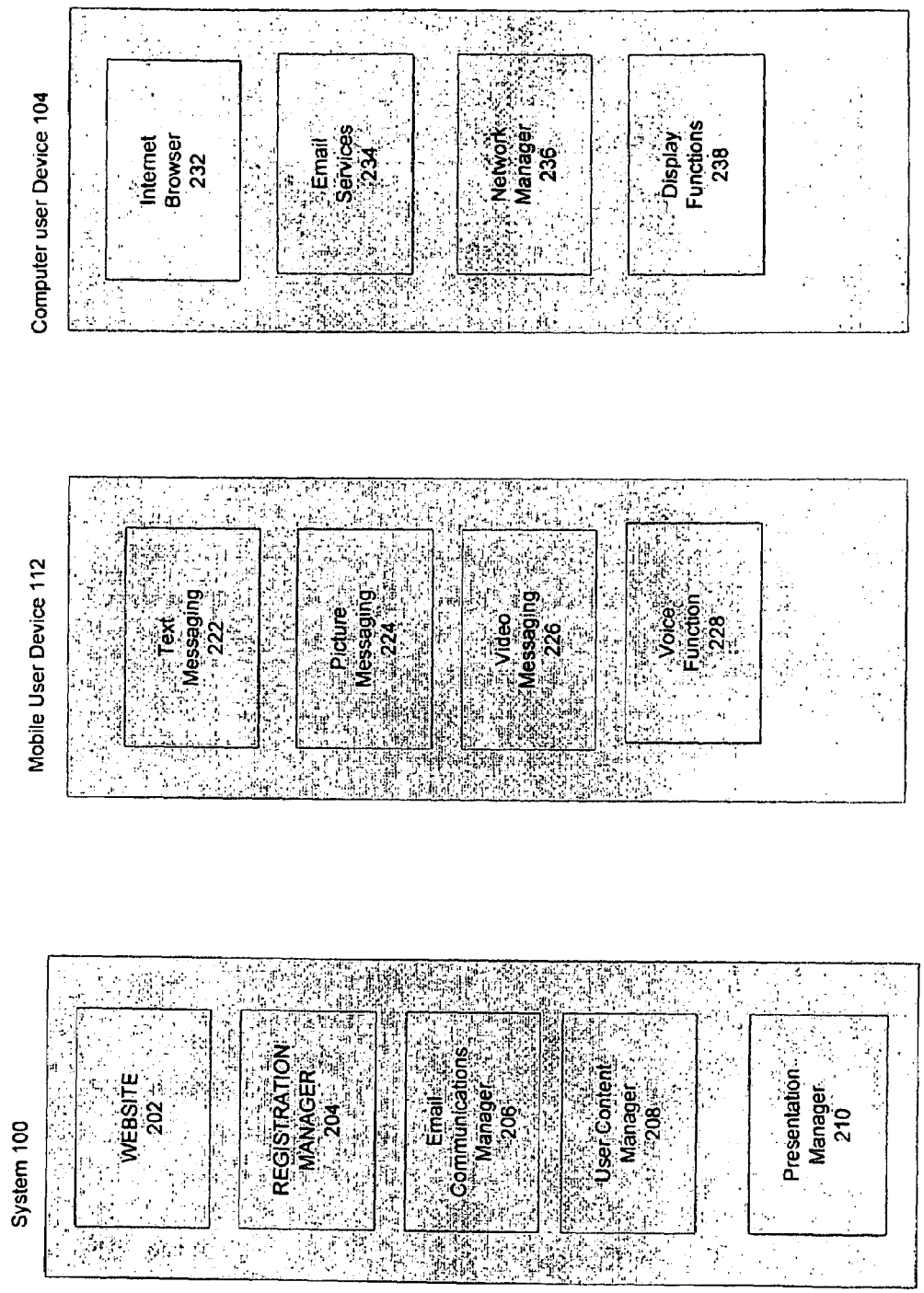
FIG. 2 is a block diagram illustrating functional aspects of the system, camera phone user and computer user of FIG. 1.

With reference now to FIG. 2, there are shown and described functional elements of system 100. System 100 is seen to include a Website 202, a Registration Manager 204, an Email Communications Manager 206, a User Content Manager 208 and a Presentation Manager 210. It will be understood that these functions may be implemented in hardware, software, or a combination of the two.

The Website 202 is a public interface for the system 100 and is designed to work with all standard Internet browsers. The Registration Manager 204 permits anonymous users to register with the service and manages user account information. The Email Communications Manager 206 receives txt, picture, and video messages from anonymous and registered users and sends txt, picture, and video messages to anonymous and registered users as required. The User Content Manager 208 is responsible for storing and retrieving user-generated content from the System's servers and enforcing permissions and privileges that may be associated with user content. The Presentation Manager 210 is responsible for providing means for anonymous and registered users to view content in various ways including an embedded slideshow view, a thumbnail view, and a full screen slideshow view.

The mobile user devices 112 are seen to include a text messaging module 222, a picture messaging module 224, a video messaging module 226 and a voice function 228.

The picture messaging module 224 supports sending and receiving still images with optional text descriptions via email services. The video messaging module 226 supports sending and receiving video clips with optional audio and text descriptions via email services. The voice messaging function 228 provides two-way voice communications.

The computer user devices 104 are seen to include an Internet browser 232, an email service 234, a network manager 236 and display functions 238. The operation of these functional features of the invention is described in detail herein below.

The internet browser 232 is the primary application for interacting with the System 100. The Email service 234 permits the computer user to receive registration messages from the System 100 and forward content of interest on to other anonymous or registered users. The network manager 236 provides the network connection required to access Internet services and operate the Internet Browser 232. Display functions 238 allow the user to view text, picture, and video content that has been contributed by Camera Phone Users.

In the description below, reference is made to a cellblock, which is a label derived by the inventors for describing a real-time collaborative on-line multimedia album.

The term "cellblock owner" is used generically herein as one who can potentially create, edit and monitor a cellblock, and "user" is used interchangeably with "visitor" and "member". As will be appreciated and as is typical with online systems, if a visitor has logged on to the online system 100, that visitor is, by definition, a "member".

FIGS. 3-10 illustrate screenshots of a real-time collaborative on-line multimedia album system according to one exemplary embodiment of the present invention. This particular embodiment, provided for illustrative purposes only, is directed to a real-time collaborative on-line multimedia album system and enables users of the system to create collaborative on-line multimedia albums for interaction and display.

Embodiments of a real-time collaborative on-line multimedia album system provide an automated front-end interface and back-end database record creation and management process that enables a service entity to create and display collaborative on-line multimedia albums in real-time via a computer network. Depending on the particular implementation of the invention, a user can log into the real-time collaborative on-line multimedia album system if they already have an account, as noted in 420 in FIG. 4. If the user does not have an account, the user may create one using 430 depicted in FIG. 4.

Each page within the Cellblock Web Site, to be described below, maintains a consistent layout and "look and feel." The page layout consists of five key elements: the title bar, the page header, the navigation system, the page body, and the page footer.

Home Page Process Flow

A user preferably links to http://www.cellblock.com/, at which point a home page or site is accessed. As will be more fully described below, by selecting one or more links, which appear on the home page, a system interface application issues an instruction to an appropriate software application.

Figure 3:
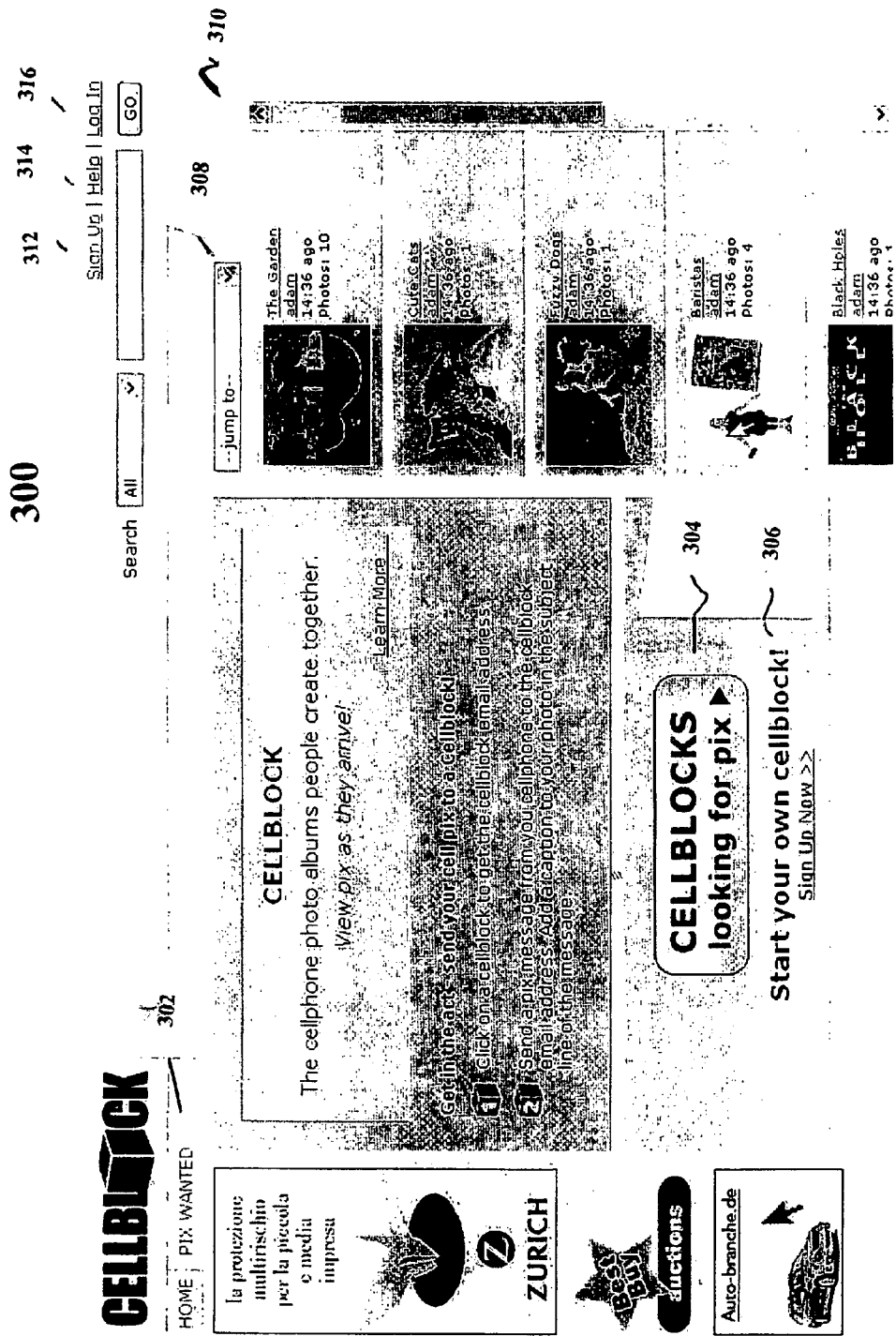
FIG. 3 is a (graphical user interface) GUI illustrating a "home-page," which welcomes visitors to a service entity website and allows the visitors to interact with the website.

FIG. 3 is a GUI 300, screenshot, web page, or the like of the cellblock website in accordance with one embodiment of the present invention. The GUI 300 is a home-page or welcome page, that is displayed upon entry into the website, which welcomes visitors to the site and allows the visitors to interact with the site. The home-page displays the registered domain name, Cellblock in the upper left corner of GUI 300. The home page 300 is typically the first page visible to a visitor of a web site. Users of the system 100 can access the system home page 300 via a standard Internet connection. The present embodiment accesses the Internet through substantially any means. The visitor is provided with the option of entering the system 100 as a registered user or as an anonymous user. If a registered user, the visitor is asked to log into his or her account. If a visitor is not a registered user, the system 100 presents a registration option that permits the visitor to register with the system 100. A user does not need to be registered to view or contribute content to cellblocks however the creation, editing, or monitoring of a cellblock does require registration, creation of an account, and login. Other functions such as flagging content as inappropriate, providing comments, and rating a given cellblock also require that the user login to the system 100.

Overall, the home page acts as the gateway to the remaining functions of the present invention. Preferably, the user navigates through the system 100 using the options presented on the home page. Preferably, the home page displays to the user a number of options (e.g., in the form of buttons, or highlighted or underlined text, displayed on the home page, which are clicked-on to make a selection). Broadly, these options include functions such as requesting pictures for existing cellblocks, i.e., "Pix Wanted" link 302 and "Cellblocks looking for Pix" link 304, registration means for starting a new cellblock, i.e., "Start your own cellblock" 306, search for an existing cellblock, i.e., "jump to" pull-down menu 308, and showing the most popular cellblocks as determined by viewer demand, (e.g., "The Garden", "Cute Cats", "Fuzzy Dogs", "Baristas" and "Black Holes" 310).

The home-page, GUI 300 has links to an "Advertise with us" agreement page, "About Us" page, "Help" page, "Terms of Use" page and "Privacy Policy" page which are self-explanatory.

Figure 4:
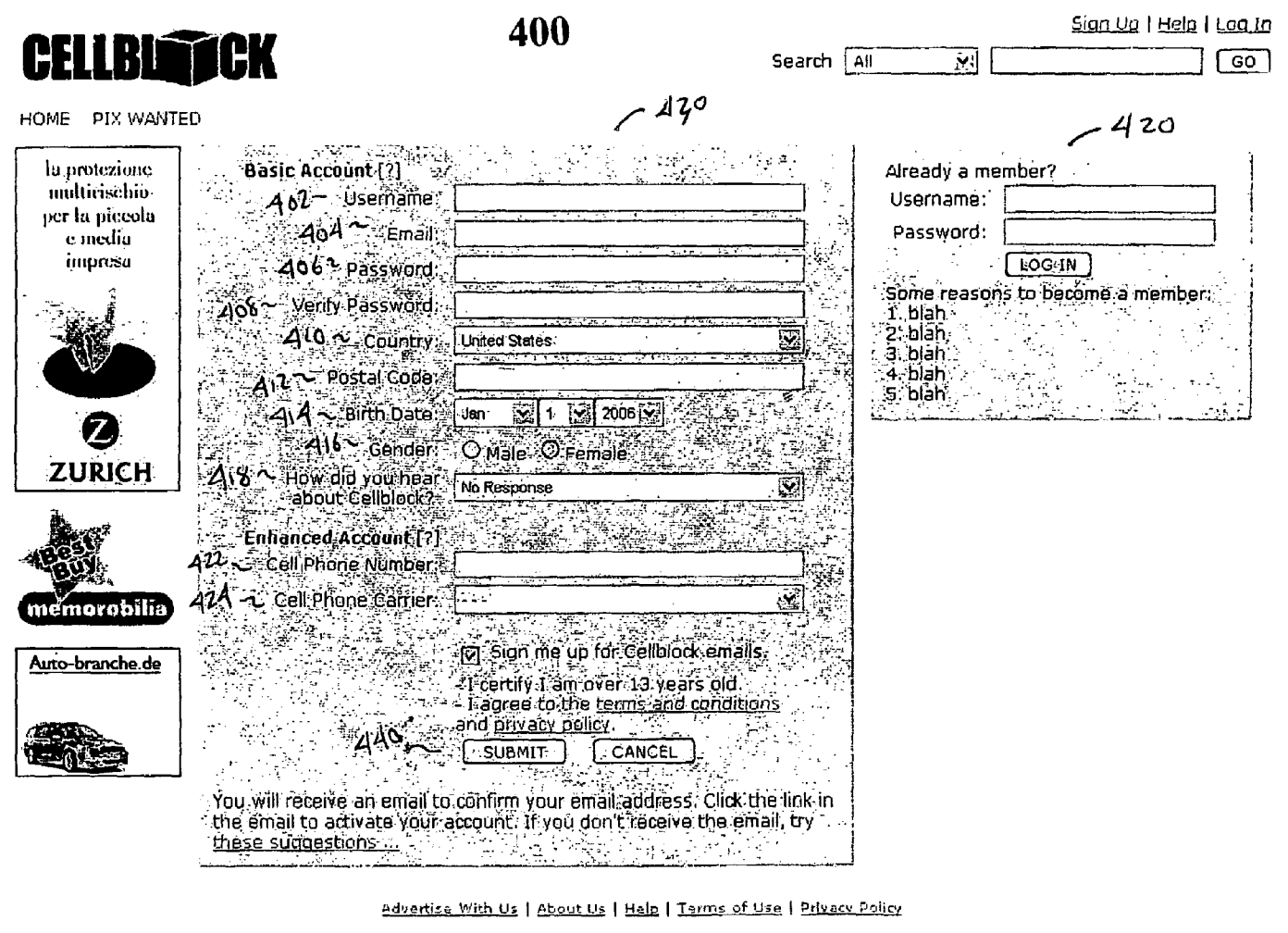

When navigation link 306, "Start your own Cellblock," is selected, the user leaves this GUI 300 and is shown FIG. 4.

FIG. 4 is a GUI 400, screenshot, web page, or the like that may be presented by the service entity website to a user upon selecting any of links 306, 312 or 316 at GUI 300.

At GUI 400, section 430 is generally divided into two sub-sections, labeled Basic Account and Enhanced Account, respectively. Each of the two accounts are free to both registered and non-registered users. It is noted that the present application sometimes refers to non-registered users as anonymous users. A Basic Account allows users to create cellblocks, edit cellblocks and monitor cellblocks. An Enhanced Account associates a cellphone number with a user and permits the service entity to provide the user with the creation, editing and monitoring features available to a basic account user, and in addition, automatically associates the user's username with all digital content contributions uploaded by the user to any cellblock of the user's choosing. This automatic association essentially comprises a personalization feature. Further, enhanced users are provided access to the My Pix feature of the website which allows users to see all the digital content the user has contributed to any cellblock from the point in time at which they first signed up with the website. An enhanced account holder is also provided with other convenience features such as the ability to start, open, and close cellblocks by issuing txt and picture messaging commands from their mobile device.

At GUI 400, non-registered users are requested to enter registration information in a registration interface 430 including, Username in the field 402 labeled Username, a current email address in the field 404 labeled Email, a password in the field 406 labeled Password, the user re-enters the same password in the field 408 labeled Verify Password, a country of origin drop down menu 410 labeled Country, a postal code in the field 412 labeled Postal Code, a birth date in the field 414 labeled Birth Date, a gender in the button group 416 labeled Gender, a means for informing the service entity about how the user heard about the site in the drop down menu 418 labeled How did you hear about Cellblock?. The next section the registration interface 430 requests that the user enter a current cell phone number in the field 422 labeled Cell phone number, and a corresponding cell phone carrier in the drop down menu 424 labeled Cell Phone Carrier.

Selecting the Submit button 440 submits the entered data to a registered user's segment of the data storage device 116. It should be appreciated that a novel aspect of the invention is that whenever a cellblock is created by a user, as described above, the hosting site does not pre-allocate server space to accommodate the newly created site. Instead, the invention operates on the principle of dynamic storage allocation which comprises allocating storage space to each cellblock in real-time, sufficient to accommodate the storage needs of the uploaded digital content, which is unknown prior to it being received at the host site.

Figure 5:
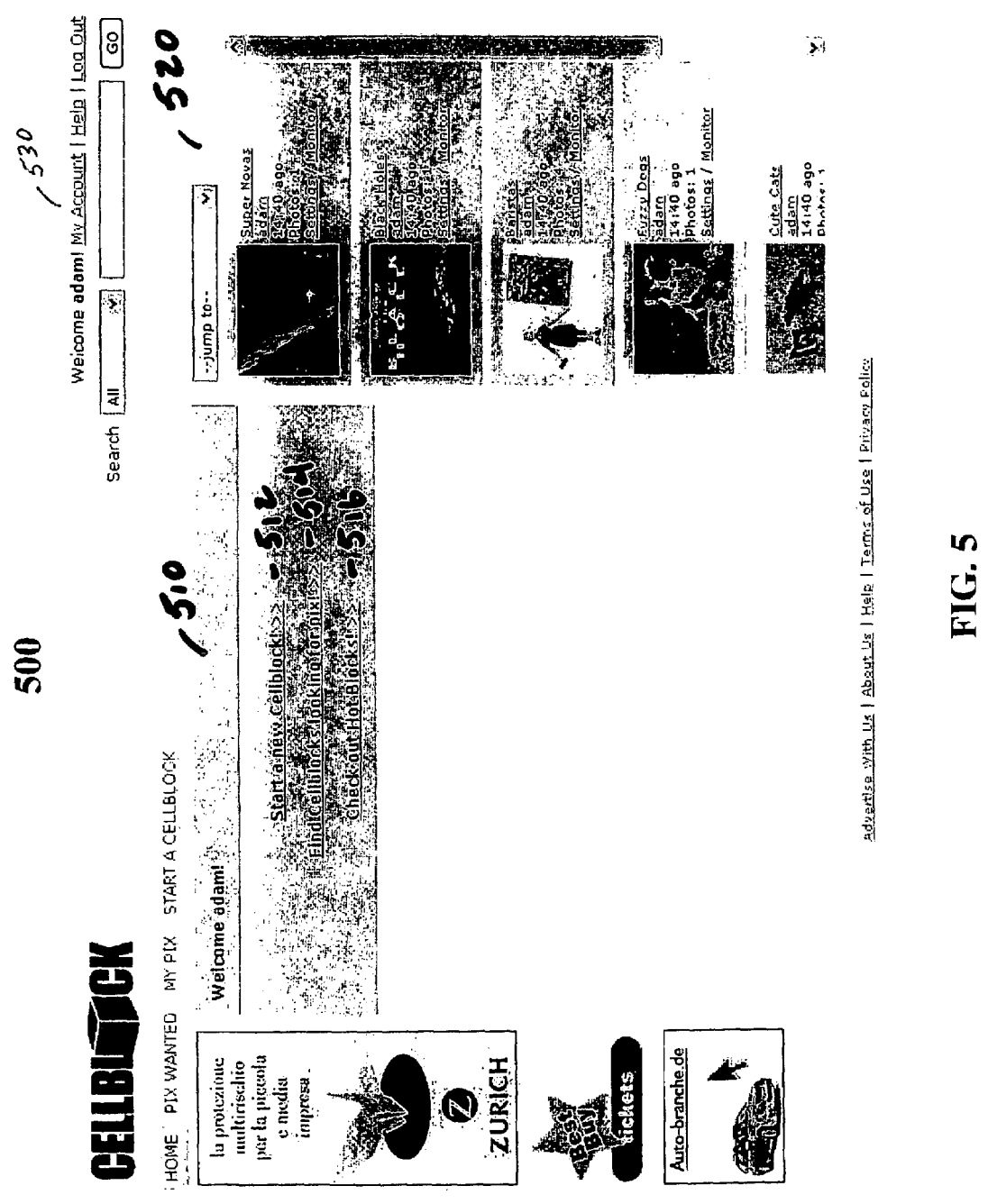

FIG. 5 is a screenshot, web page, or the like of the cellblock website in accordance with one embodiment of the present invention that is presented to a registered user, after the registered user logs in via any of links 316 at GUI 300 or link 420 at GUI 400.

GUI 500 includes a section 510 that provides a user with three (3) options. A first option, link 512, for starting a new cellblock 512. A second option, link 514, for finding cellblocks looking for digital content 514, and a third option, link 516, for viewing so-called Hot Blocks, which are popular cellblocks on the cellblock site.

GUI 500 includes a section 520, on the right side of GUI 500, that provides a list of the user's currently owned cellblocks.

GUI 500 includes a My Account link 530, which provides the user with the ability to change the majority of settings established at GUI 400, with the exception of Username. For example, the user can change the password, postal code, cell phone number and so on, as needed.

Figure 6:
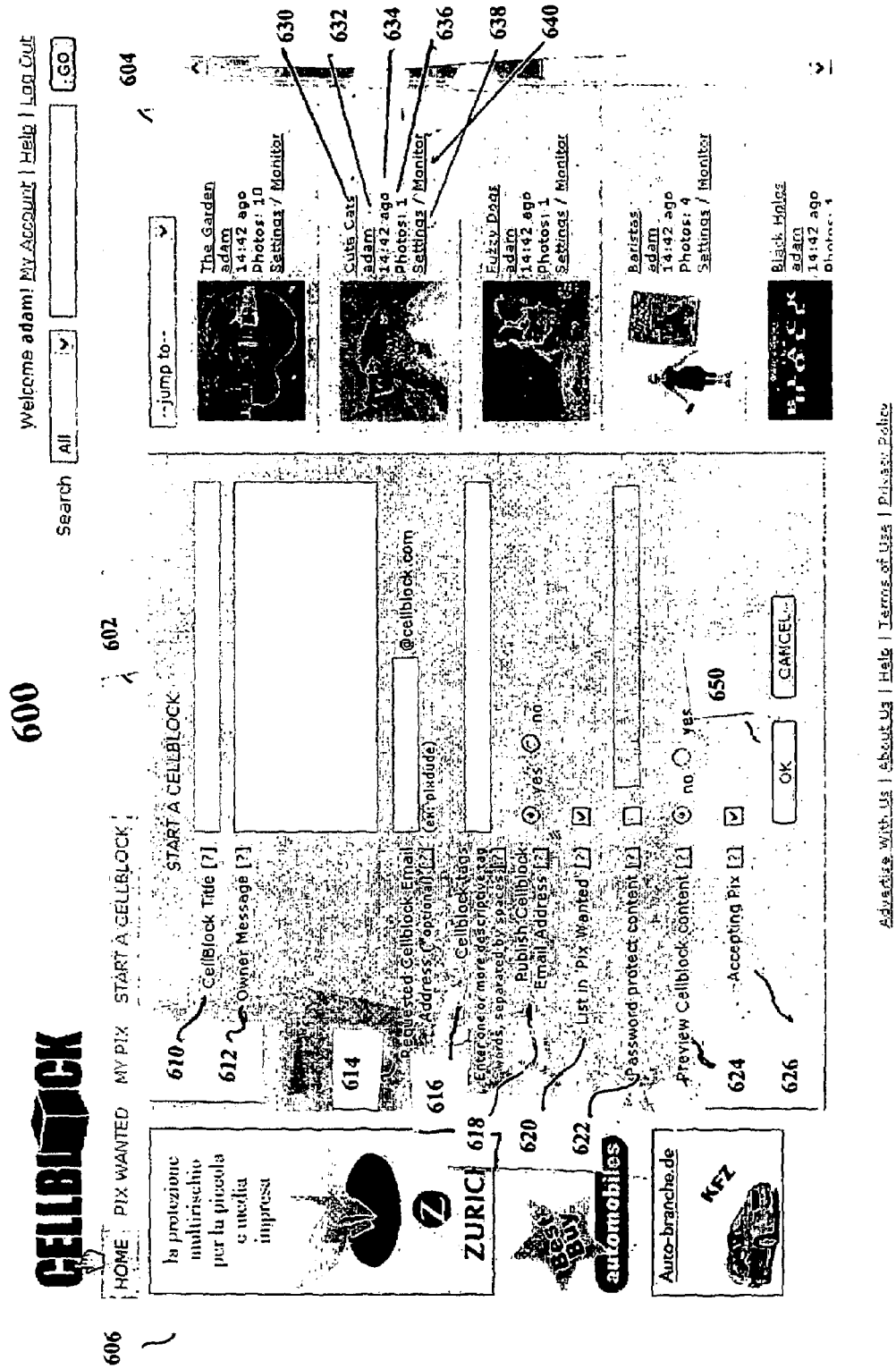
FIG. 6 is an example of a GUI, screenshot, web page or the like that may be presented by the service entity website that is presented to a user, upon the user selecting Start a new Cellblock link at GUI 500.

FIG. 6 is a screenshot, web page, or the like of the cellblock website in accordance with one embodiment of the present invention that is presented to a user, upon the user selecting Start a new Cellblock link 512 at GUI 500. GUI 600 includes a section 602 that displays preference setting information. For each of these settings, the service entity provides default values, as shown, which the user may modify if desired or may choose to leave unmodified.

Referring now to section 602 of GUI 600, a registered cellblock owner enters the cellblock title in the field 610 labeled Cellblock Title. The Cellblock Title field 610 allows the cellblock owner to describe the nature and purpose of the cellblock using a short phrase or sentence and makes it easier for others to find the cellblock via a search function. The Cellblock title does not need to be unique.

The cellblock owner then enters an owner message in the field 612 labeled Owner's Message. The owner's message permits the cellblock owner to add more specific details regarding the content or operation of the cellblock. For example, the owner of a restaurant or bar may include the normal hours that the cellblock is open to content contribution (e.g., Open to the public from 9 PM-2 PM, every Friday and Saturday night).

The cellblock owner is then provided with the option of specifying a unique cellblock email address in the field 614 labeled Requested Cellblock Email Address. In the event the cellblock owner chooses not to enter a unique cellblock email address, the newly created cellblock is assigned a randomly generated, potentially more secure email address. If a cellblock owner requests a specific cellblock email address that was previously assigned to another user, the service entity will indicate that a previous assignment has been made and request that the cellblock owner enter another email address. It is noted that the service entity guarantees the uniqueness of randomly assigned cellblock email addresses it assigns, such that a user is not required to go through a verification process.

The cellblock owner then enters one or more descriptive tag words in the field 616 labeled Cellblock Tags. Cellblock tags are search terms or keywords that permit other users to find the cellblock more easily via the search function of the service. For example, a cellblock owner that creates a cellblock for pictures of pets might specify one or more tags such as cats, dogs, fish, hamsters, and guinea pigs.

The cellblock owner then selects, via button group 618, whether or not the cellblock email address is to be published (posted) on the cellblock website or not published (hidden from other users on the cellblock website). The default selection is "published". Published cellblock email addresses enable visitors and other users unknown to the cellblock owner to more easily contribute content to cellblocks since the email address is available on the website.

The cellblock owner then selects, via checkbox 620, whether he or she wishes the cellblock to be listed in the "Pix Wanted" section of the website, listing those cellblocks requesting digital content from users for incorporation into the cellblock. The default selection is to list the cellblock. If the cellblock owner chooses not to publish the cellblock email address in 618, then the Pix Wanted checkbox 620 will be automatically deselected.

The cellblock owner then selects whether to password protect the digital content from viewing, via checkbox 622. The default selection is not to use password protection. It should be noted that this password protection feature only applies to the ability to view the cellblock content. Any user with a cellblock email address, whether it is published or not, can contribute to a cellblock independent of this password feature.

Button group 624 allows the cellblock owner to specify whether to manually accept contributed content for verification purposes in preview mode or automatically accept contributed content in the instant mode. The default selection is instant mode. It is noted that the preview feature is advantageous for public events where there are large viewing screens and large numbers of digital content contributors making it necessary to monitor and manually accept contributed content before it is available for viewing.

Checkbox, 626, "Accepting Pix", provides the cellblock owner with the option of setting the cellblock to either an open or closed state. In the open state, the cellblock may receive digital content, which is the default state. The cellblock owner can change this setting at will.

The right column 604 of GUI 600 displays any previous cellblocks that the owner may have created. Five (5) are shown in section 604, by way of example only. For each previously created cellblock, basic status information is provided, such as the cellblock title 630, cellblock owner 632, the time the cellblock was last updated or modified 634, the number of pictures or video clips that have been contributed to the cellblock 636, and links allowing the owner to edit cellblock settings 638 or monitor incoming content 640. If the owner had not previously created any cellblocks, section 604 may be replaced with advertisements, such as those shown in section 606 on the left hand side of GUI 600.

Selecting the OK button 650 submits the entered data to a registered user's segment of the data storage device 116.

Figure 7:
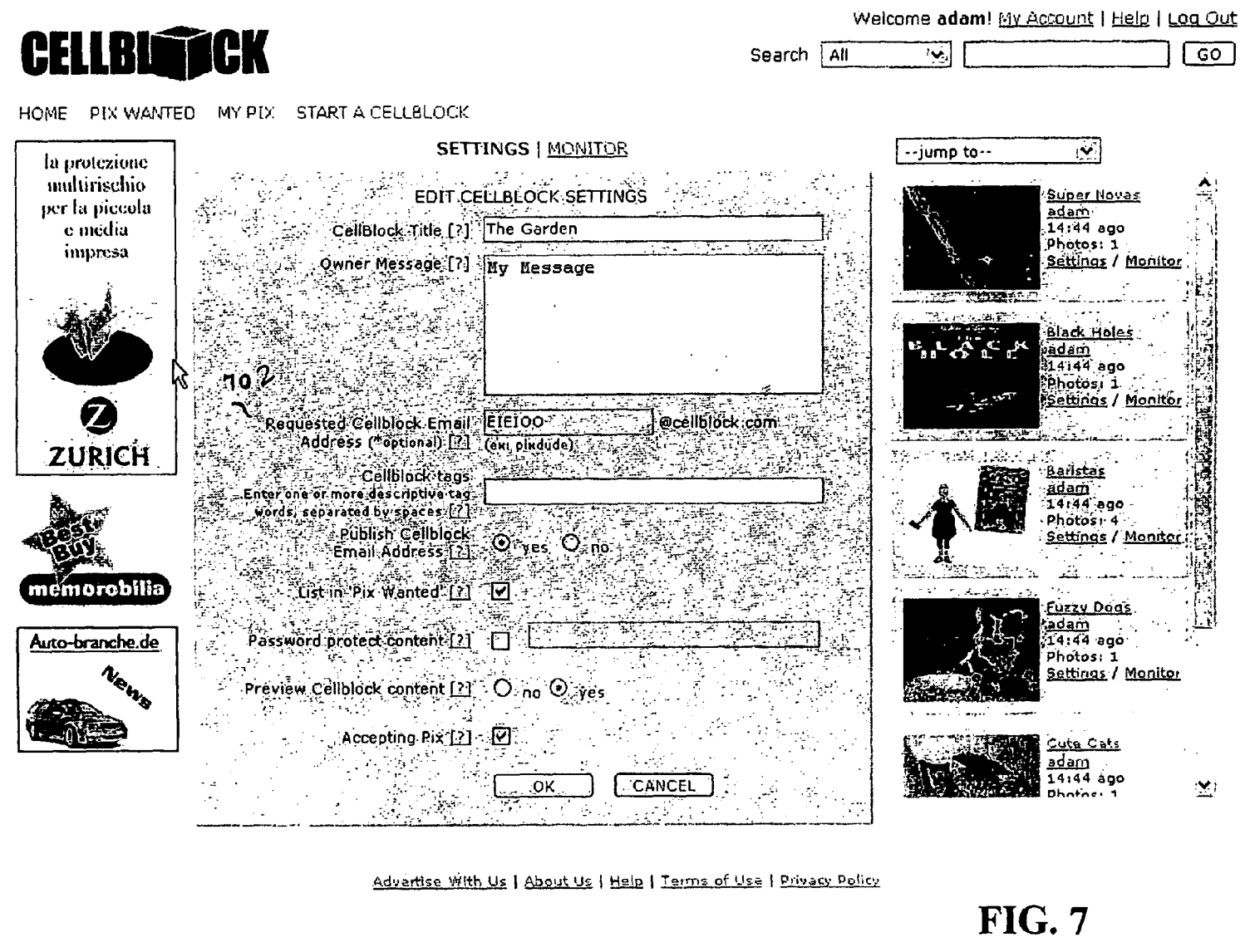

FIG. 7 is a GUI 700, screenshot, web page, or the like that may be presented by the service entity website to a user for editing the preference settings of a previously created user owned cellblock.

It is noted that GUI 700 is similar in appearance and functionality to that shown in GUI 600 of FIG. 6 for creating a new cellblock. After a cellblock has been created by a registered user, the majority of the cellblock settings are available for editing at any time, with the single exception of the assigned cellblock email address.

Figure 8:
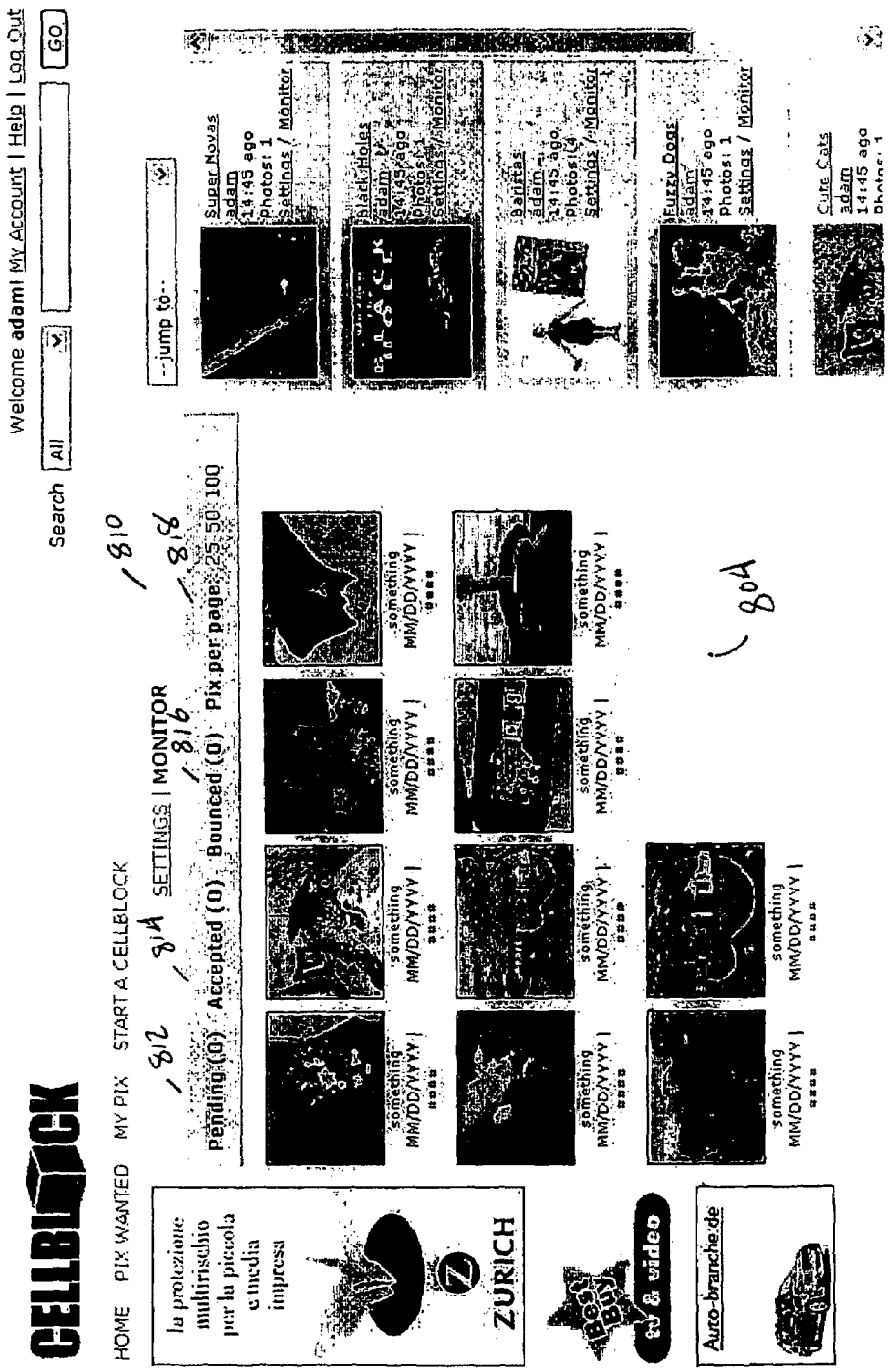
FIG. 8 is an example of a GUI, screenshot, web page or the like that may be presented by the service entity website to a user for monitoring the content of a cellblock.

FIG. 8 is a GUI 800, screenshot, web page, or the like that may be presented by the service entity website to a user upon selecting the monitor link as provided by any of the GUIs that includes a list of the user's currently owned cellblocks, such as, for example, FIGS. 5-7.

GUI 800 includes three (3) links in section 810, a pending link 812, an accepted link 814 and a bounced link 816. Clicking on the pending link 812 causes software processes to retrieve digital content from a pending folder for display that has been submitted by any user, whether registered or anonymous, but not yet approved for viewing. Clicking on the accepted link 814 causes software processes to retrieve digital content from an accepted folder for display that has been accepted by the user and is available for viewing. For example, the thumbnails shown in section 804. Clicking on the bounced link 816 causes software processes to retrieve digital content from a bounced folder provided by users that the cellblock owner has bounced from the cellblock. As defined herein, bouncing a user constitutes preventing that user from uploading any digital content to a particular cellblock of the user. Other users are bounced from a particular cellblock of the cellblock owner on a cellblock by cellblock basis. A cellblock owner has the option of un-bouncing any user at the owner's discretion. Un-bouncing a user places that user's digital content back from the bounced folder into the pending folder. The pix per page link 818 allows the owner to view more or less thumbnails on a given page and may aid in the content screening process.

This GUI 800 provides a user with the ability to monitor a pre-existing cellblock. A user may view the contents of a given cellblock using an embedded viewer embedded in the website for viewing the cellblock's digital content. Alternatively, a user may view a cellblock in full screen mode, suitable for public events where group viewing is appropriate. In full screen mode, the digital content consumes the entire screen. In both the embedded and full screen modes, the user viewing the digital contents of a given cellblock has the option of viewing the cellblock in a manual mode where the user is provided with a number of viewing options. Specifically, the user has the option of viewing the digital contents of the cellblock by either, manually paging through thumbnails of the digital content or in an automatic slide show mode, where the slide show is a sequential display of each of the digital content in a predetermined order for a predetermined length of time or by viewing all of the slides in a thumbnail view, as shown in section 804 of GUI 800. The system 100 makes a number of automatic slide show modes available to the viewer, each of which is designed to support various event types such as, for example, "Show most recent slides", "Show all slides", or "Random shuffle slides." It should be noted that the amount of digital content available within a given cellblock may change at any time as users contribute new content or the cellblock owner modifies the content.

Figure 9:
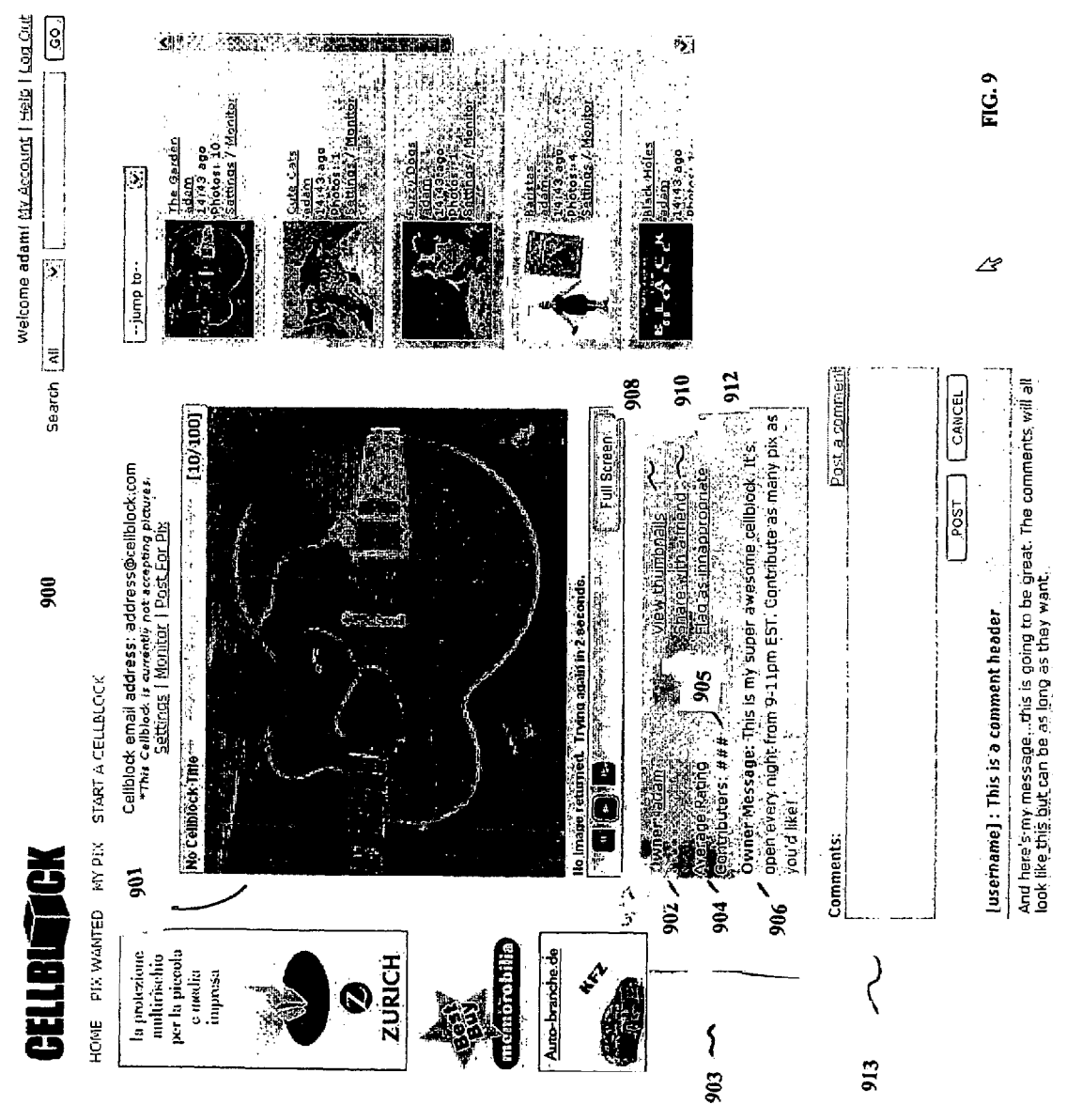

FIG. 9 is a GUI 900, screenshot, web page, or the like that may be presented by the service entity website to a user in response to the user selecting one of the available slide show modes for viewing the thumbnails as shown in section 804 of GUI 800. By way of example, there is shown, in section 901, a particular slide, i.e., slide 10 of 100 slides for a cellblock. Below section 901, there is shown a section 903, including the cellblock owner's name 902, e.g., Adam, an average rating of the cellblock 904 as determined by other registered users, the current number of contributors to the cellblock 905, an Owner's Message 906, and various links such as, a View Thumbnails link 908, a Share with a friend link 910, a Flag as inappropriate link 912. One advantage of being a registered user with the cellblock site is the ability to rate digital content. Other advantages of being a registered user with the site include, the ability to edit and monitor a cellblock via system provided software processes. A registered user may also post a cellblock address requesting digital content in the Pix Wanted section of the cellblock website.

Below section 903 there is shown a section 913, for entering comments on the thumbnails being displayed in section 901. The ability to provide comments is only made available to registered users who have logged in to the service.

Figure 10:
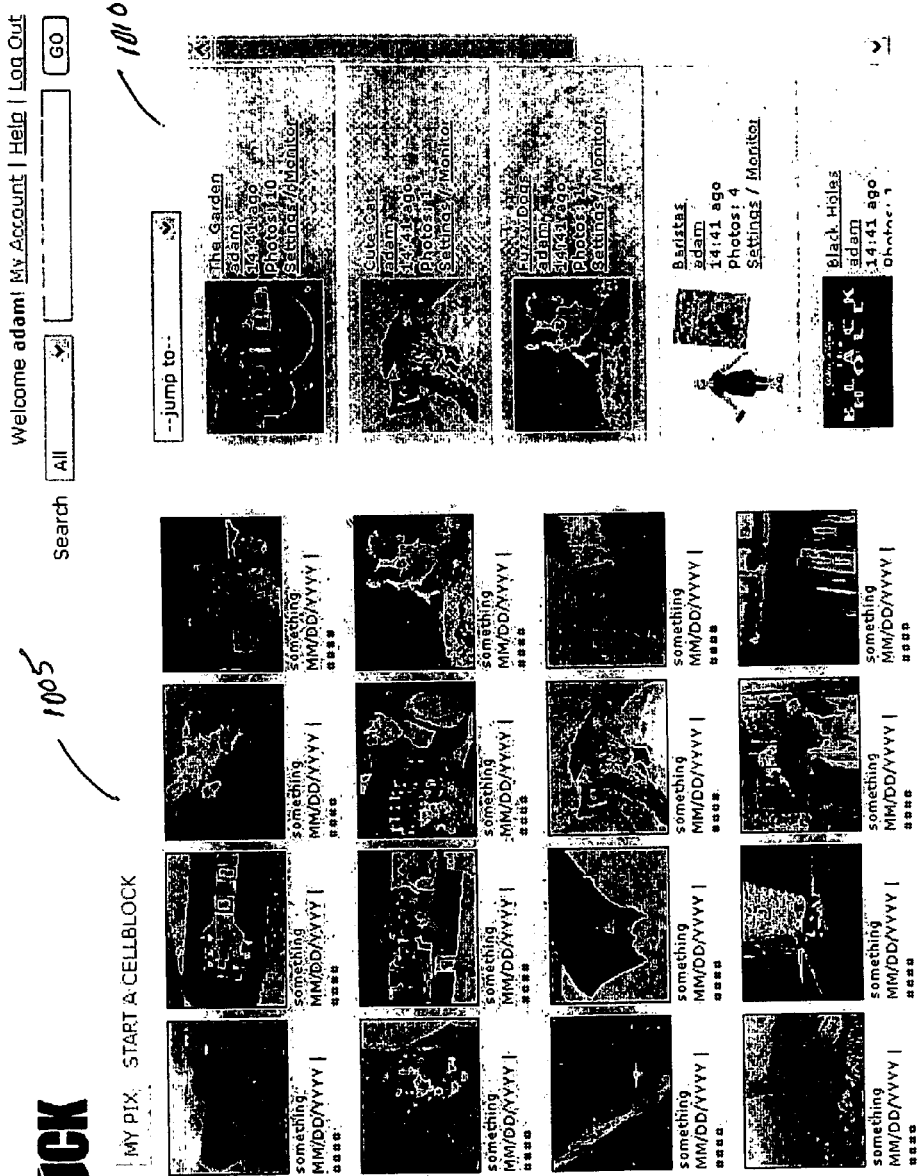
FIG. 10 is an example of a GUI, screenshot, web page or the like that may be presented by the service entity website to a user in response to the user selecting the My Pix link.

FIG. 10 is a GUI 1000, screenshot, web page, or the like that may be presented by the service entity website to a user in response to the user selecting the My Pix link provided on the selection bar at the top of each webpage of the cellblock website. As briefly discussed above with reference to GUI 400 of FIG. 4, the My Pix feature of the website allows users to view all the digital content the user has contributed to any cellblocks (e.g., such as those shown in section 1010) from the point in time at which the user initially signs up with the cellblock website and activates an enhanced account. GUI 1000 illustrates in section 1005, thumbnail sketches of the digital content contributed by the cellblock owner to the cellblock site.

Figure 11:
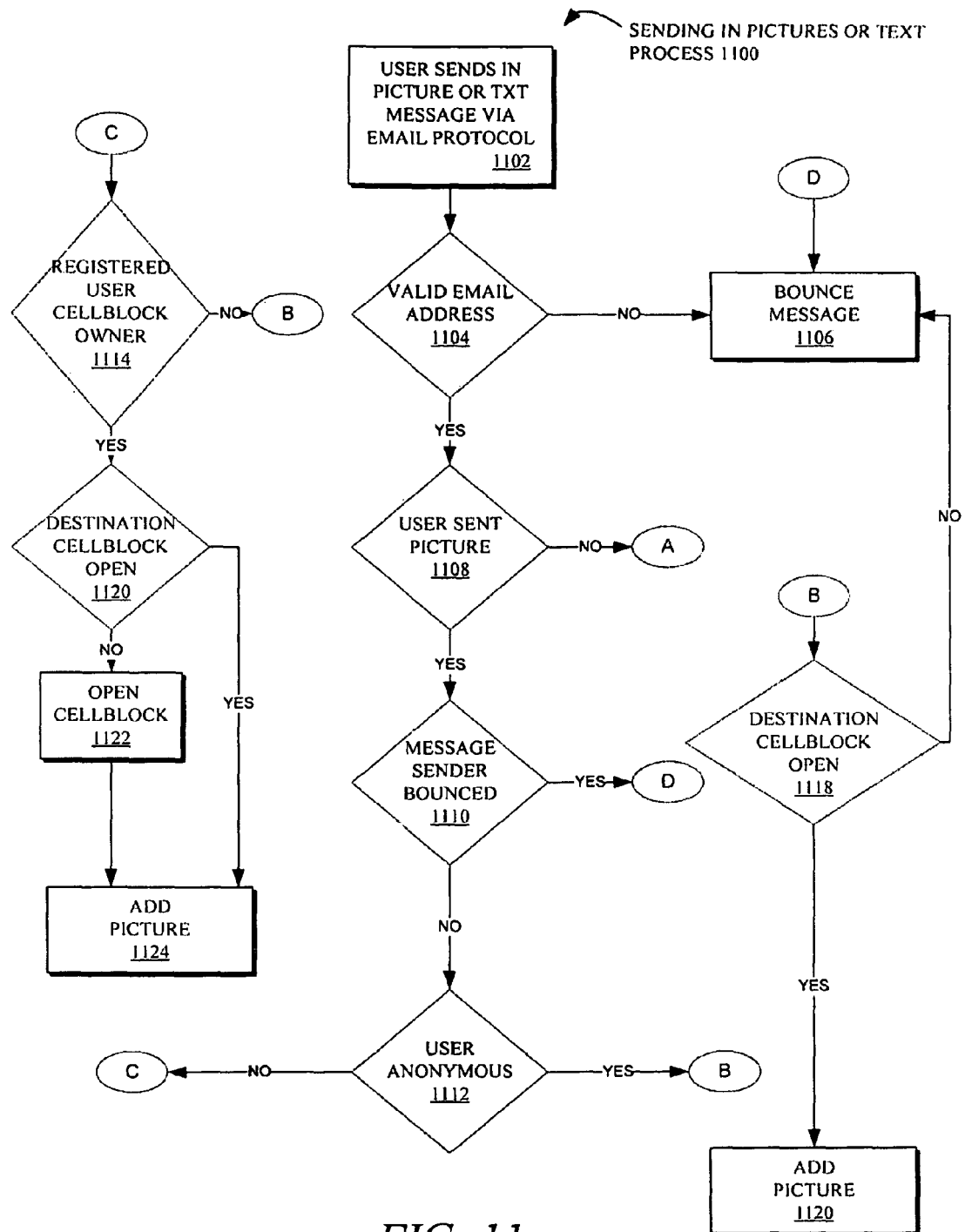
FIGS. 11-12 are flowcharts showing a process for a user sending in text and pictures (i.e., digital content) to a cellblock of the cellblock host site.

With reference now to FIG. 11, there is shown a process 1100 for sending in text and digital content including, for example, digital images and digital video clips, to a cellblock of a host site. While the following description makes reference to pictures, it is understood that the term encompasses digital images, digital video clips and other suitable digital content amenable for uploading over a network.

In accordance with the invention, a user with a camera phone, such as users 106a-c, send in a picture or text message to a given cellblock of a host site (step 1102) via any well known email protocol. The cellblock service entity then determines whether the originating email address is of the form, <10-digit-phone number>@<wireless carrier domain>, e.g. 3012501234@vzw.com or 987654321@cingular.com (step 1104). Valid phone number formats and carriers for the United States are described herein however, it is contemplated that phone number formats and carriers for other countries are equally supported. If it is determined that the originating email address is invalid, the email message is bounced (step 1106). The process terminates at this point. Otherwise, if it is determined that the originating email address is valid, it is then determined whether the user sent a picture or text (step 1108). If the user sent text then the process continues as described below with reference to the flowchart of FIG. 12. Otherwise, if the user sent a picture, it is then determined whether the message sender has been bounced by the owner of the destination cellblock (step 1110). If the message sender has been blocked (bounced), the message is bounced (1106) and the process terminates. Otherwise, if the message sender is not blocked (bounced), it is then determined whether the message sender is a registered user of the cellblock service or an anonymous user (step 1112). If the user is an anonymous user, it is then determined if the destination cellblock is open (step 1118). If so, the picture sent by the anonymous message sender is added to the cellblock (step 1120) and the process terminates. Otherwise, if the user is a registered user, it is then determined whether the registered user is the cellblock owner (step 1114). If the user is not the cellblock owner and the destination cellblock is open (step 1118), then the picture is added to the cellblock (step 1120). If the registered user is the cellblock owner, it is then determined if the destination cellblock is open (step 1120). If it is found that the destination cellblock is open, then the picture provided by the registered user is added to the destination cellblock (step 1124) and the process terminates. Otherwise, if it is determined that the cellblock is closed, then the cellblock is opened (1122) and the picture provided by the registered user is added to the cellblock (1124) and the process terminates.

Figure 12:
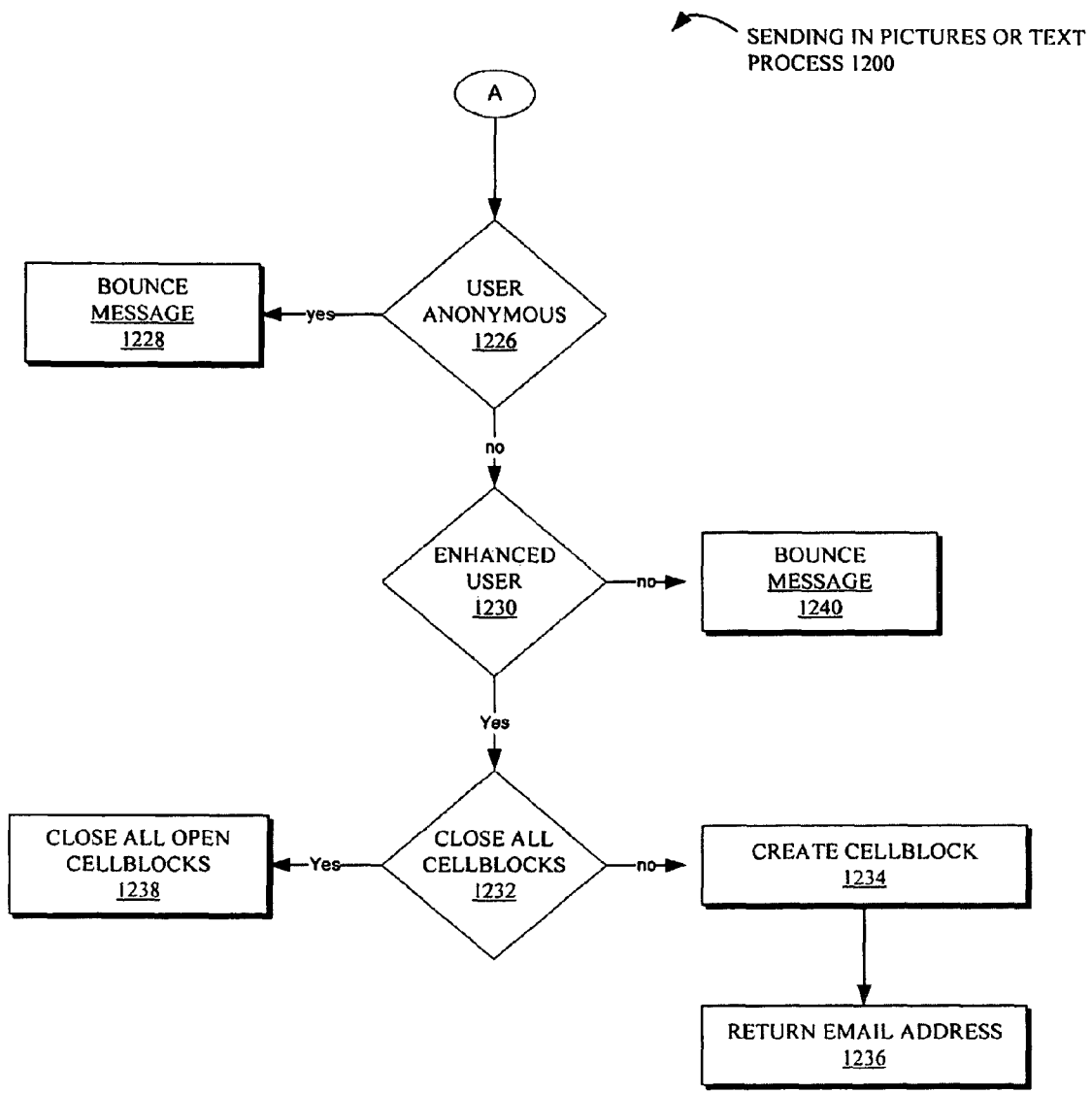

With reference now to FIG. 12, there is shown a continuation of the flowchart of FIG. 11. Specifically, FIG. 12 illustrates the detailed steps for the case where a user sends in text via an email message instead of a picture at step 1108 of the flowchart of FIG. 11.

Upon determining at step 1108 of FIG. 11 that a user has sent in a text message to a predefined address, the process is further described at FIG. 12, where it is determined if the user is an anonymous user (step 1226). If so, the message is bounced (step 1228) and the process terminates. Otherwise, it is then determined if the registered user is an enhanced user or a basic service user (step 1230). If the user is determined to be a basic service user, then the message is bounced (step 1240). Otherwise, if the user is determined to be an enhanced user, it is then determined whether the user intends to close all of the user owned cellblocks (step 1232). If the enhanced user wishes to close all of the user owned cellblocks, those cellblocks will be closed in accordance with the user's direction (step 1238). Otherwise, a cellblock will be created for the registered, enhanced user, which will be automatically opened to receive digital content (step 1234). Then, an email address for the newly created cellblock is returned to the owner via a txt message so that the digital content may be contributed (step 1236).

There have thus been provided new and improved methods and systems for building real-time collaborative on-line multimedia albums over a network. In accordance with the present invention, these methods and systems are adapted to facilitate the construction of the multimedia albums which comprise digital content, such as photos and video clips, provided by multiple authors, taken from each author's unique perspective. The invention uniquely creates these multimedia albums to be optimized for dynamic updating, real-time interaction, and rapid dissemination to a viewing audience, for public and/or private viewing, either one photo/video clip at a time or as a slide-show.

While the invention has been shown and described with respect to particular embodiments, it is not thus limited. Numerous modifications, changes and improvements falling within the scope of the invention will now occur to those skilled in the art.

We claim:

1. A method for creating, editing and monitoring real-time collaborative on-line multimedia albums at a host site, wherein said host site hosts a central system comprising an automated front-end website interface and a back-end database record creation and management process for creating, editing, monitoring and viewing a plurality of real-time collaborative on-line multimedia albums, the method comprising:

receiving at the central system, a request from a previously registered user to create and manage a multimedia album at the central system, dynamically allocating storage space on a data store at the central system to create a multimedia album responsive to said registered user request, providing the requesting registered user with exclusive authority as content manager of the multimedia album for controlling, moderating and enforcing permissions and privileges associated with viewing, contributing and accessing content associated with the multimedia album, publishing an assigned unique email address of the multimedia album to allow registered and anonymous users to upload digital contributions to the multimedia album, randomly receiving at said assigned unique published email address of the multimedia album digital content contributions from at least two content contributors for incorporation into said created multimedia album, wherein said at least two content contributors comprise registered and anonymous content contributors, wherein said randomly contributed digital contributions are uploaded from said registered and anonymous content contributors to said central system using non-proprietary software means, and making the received digital content contributions available in real-time for public and private viewing over one of a public or private network, wherein said public and private viewing is hosted at the central system, and wherein said public viewing comprises simultaneously viewing the received digital content contributions by a plurality of viewers in a public forum.

2. The method of claim 1, wherein the step of creating said multimedia album includes the step of assigning said unique email address at said host site.

3. The method of claim 1, wherein said digital content contributions are received at said host site from respective mobile devices operated by said at least two content contributors.

4. The method of claim 1, wherein said received digital content is of an unknown quantity, quality and periodicity.

5. The method of claim 1, wherein the step of creating said multimedia album further comprises the step of dynamically allocating storage space at said host site in real-time.

6. The method of claim 1, wherein said digital content is received via said unique assigned email address.

7. The method of claim 1, further including the step of: dynamically opening said assigned unique email address corresponding to said created multimedia album, at the discretion of said requesting user, to permit the incorporation of said received digital content from said at least two content contributors into said created multimedia album.

8. The method of claim 1, further including the step of: dynamically closing said assigned unique email address corresponding to said created multimedia album, at the discretion of said requesting user, to disable the incorporation of said received digital content from said at least two content contributors into said created multimedia album.

9. The method of claim 1, wherein said digital content is selected from the group comprising digital graphic images and digital video clips.

10. The method of claim 1, further comprising assigning certain preference settings to said created multimedia album.

11. The method of claim 10, wherein said certain assigned preference settings are selected from the group comprising: a public/private setting and a password protection setting and an owner tag setting and an owner message setting and a display mode setting and an email publication setting.

12. The method of claim 11, wherein said email publication setting determines whether said unique email address is published on a hosting site hosting said created multimedia album.

13. The method of claim 11, wherein said display mode setting determines whether said received digital content is made immediately available for viewing or is instead placed into a pending state requiring pre-approval prior to being made available for viewing.

14. The method of claim 11, wherein said public/private mode setting determines whether said digital content is made available for public or private viewing.

15. The method of claim 11, wherein said password protection mode setting determines whether viewing said received digital content requires a password.

16. The method of claim 11, wherein said owner tag setting assigns specific details regarding the content or operation of the created multimedia album.

17. The method of claim 1, wherein said preference settings are modifiable subsequent to the creation of said created multimedia album.

18. The method of claim 1, further including the step of: assigning descriptive key words to said created multimedia albums to facilitate searching for said created multimedia album from among a plurality of created multimedia albums, wherein said key words describe the nature and purpose of the created multimedia album.

19. The method of claim 1, further including the step of: viewing the received digital content contributions received from said at least two content contributors for incorporation into said created multimedia album.

20. The method of claim 19, wherein said received digital content is viewed as one of a series of thumbnails or in a slide-show mode.

21. The method of claim 1, further including the step of: preventing certain users from uploading their respective digital content into said created multimedia album.

22. The method of claim 1, further including the step of: posting the unique email address corresponding to the created multimedia album at the host-site to request digital content contributions from other users.

23. A system for creating, editing and monitoring real-time collaborative on-line multimedia albums at a host site, comprising:
 a memory storing control instructions; and
 a processor connected to the memory and operative in response to the control instructions to perform the steps of:
  receiving at the central system, a request from a previously registered user to create and manage a multimedia album at the central system,
  dynamically allocating storage space on a data store at the central system to create a multimedia album responsive to said registered user request,
  providing the requesting registered user with exclusive authority as content manager of the multimedia album for controlling, moderating and enforcing permissions and privileges associated with viewing, contributing and accessing content associated with the multimedia album,
  publishing an email address of the multimedia album to allow registered and anonymous users to upload digital contributions to the multimedia album,
  randomly receiving at said published email address of the multimedia album digital content contributions from at least two content contributors for incorporation into said created multimedia album,
  wherein said at least two content contributors comprise registered and anonymous content contributors, and
  wherein said randomly contributed digital contributions are uploaded to said central system using non-proprietary software means,
  making the received digital content contributions available in real-time for public and private viewing over one of a public or private network,
  wherein said public and private viewing is hosted at the central system, and
  wherein said public viewing comprises simultaneously viewing the received digital content contributions by a plurality of viewers in a public forum.

24. A system for creating, editing and monitoring real-time collaborative on-line multimedia albums at a host site, comprising:
 means for receiving at the central system, a request from a previously registered user to create and manage a multimedia album at the central system,
 means for dynamically allocating storage space on a data store at the central system to create a multimedia album responsive to said registered user request,
 means for providing the requesting registered user with exclusive authority as content manager of the multimedia album for controlling, moderating and enforcing permissions and privileges associated with viewing, contributing and accessing content associated with the multimedia album,
 means for publishing an email address of the multimedia album to allow registered and anonymous users to upload digital contributions to the multimedia album
 means for randomly receiving at said published email address of the multimedia album digital content contributions from at least two content contributors for incorporation into said created multimedia album,
 wherein said at least two content contributors comprise registered and anonymous content contributors, and
 wherein said randomly contributed digital contributions are uploaded to said central system using non-proprietary software means,
 means for making the received digital content contributions available in real-time for public and private viewing over one of a public or private network,
 wherein said public and private viewing is hosted at the central system and wherein said public viewing comprises simultaneously viewing the received digital content contributions by a number of viewers in a public forum.

25. A non-transitory computer storage medium storing instructions operable on a computer for creating, editing and monitoring real-time collaborative on-line multimedia albums at a host site, comprising:
 the instructions operable on a computer to perform the steps of:
  receiving a request from a previously registered user to create and manage a multimedia album at the central system,
  dynamically allocating storage space on a data store at a central system to create a multimedia album responsive to said registered user request,
  providing the requesting registered user with exclusive authority as content manager of the multimedia album for controlling, moderating and enforcing permissions and privileges associated with viewing, contributing and accessing content associated with the multimedia album, publishing an assigned unique email address of the multimedia album to allow registered and anonymous users to upload digital contributions to the multimedia album randomly receiving at said assigned unique published email address of the multimedia album digital content contributions from at least two content contributors for incorporation into said created multimedia album, wherein said at least two content contributors comprise registered and anonymous content contributors, wherein said randomly contributed digital contributions are uploaded from said registered and anonymous content contributors to said central system using non-proprietary software means, and making the received digital content contributions available in real-time for public and private viewing over one of a public or private network, wherein said public and private viewing is hosted at the central system, and wherein said public viewing comprises simultaneously viewing the received digital content contributions by a plurality of viewers in a public forum.

26. A method operable on a computer for establishing a networked multimedia album, comprising:

generating a request from a previously registered user to establish a networked multimedia album for receiving digital content contributions from at least two content contributors, wherein the at least two content contributors comprise registered and anonymous content contributors, wherein said randomly contributed digital contributions are uploaded from said registered and anonymous content contributors to said central system using non-proprietary software means, generating in association with the request at least one data range during which the at least two content contributors can add digital content to the networked multimedia album;

generating in association with the request at least one preference for the networked multimedia album selected from the group including a public/private setting, a password protection setting, an owner tag setting, an owner message setting, a display mode setting, and an email publication setting, and receiving from a central system, in response to the request, at least one unique address, to which the at least two content contributors can transmit digital content for entry into the networked multimedia album publishing by the central system, said at least one unique address of the networked multimedia album to allow registered and anonymous users to upload digital content to the networked multimedia album, randomly receiving at said unique address, content contributions from at least two content contributors for incorporation into said networked multimedia album comprising said registered and anonymous content contributors, wherein said content contributions are uploaded from said registered and anonymous content contributors to said central system using non-proprietary software means, and making the received content contributions available in real-time for public and private viewing over one of a public or private network, wherein said public and private viewing is hosted at the central system, and wherein said public viewing comprises simultaneously viewing the received digital content contributions by a plurality of viewers in a public forum.

* * * * *